United States Patent [19]

Thompson

[11] 4,141,950

[45] Feb. 27, 1979

[54] METHOD FOR MAKING FLEXIBLE, CYLINDRICAL BEARINGS

[75] Inventor: Arnold R. Thompson, Brigham City, Utah

[73] Assignee: Thiokol Corporation, Newtown, Pa.

[21] Appl. No.: 758,744

[22] Filed: Jan. 12, 1977

[51] Int. Cl.² .................. B29C 5/00; B29D 3/00; B29H 7/00; B29H 3/06

[52] U.S. Cl. .................. 264/138; 264/262; 264/267; 264/271

[58] Field of Search ............... 264/271, 277, 278, 328, 264/329, 262, 267, 138, 161; 308/26, 237 R, 238; 260/29.7 M, 31.2 MR, 743, 746, 739

[56] References Cited

U.S. PATENT DOCUMENTS

| | | | |
|---|---|---|---|
| 2,351,329 | 6/1944 | Gerstenmaier | 264/262 |
| 2,689,755 | 9/1954 | Krotz | 264/261 |
| 2,845,657 | 8/1958 | Beare | 264/262 |
| 2,864,130 | 12/1958 | Beare | 264/262 |
| 3,608,049 | 9/1971 | Tavella | 264/262 |
| 3,961,014 | 6/1976 | Pasch et al. | 264/328 |

FOREIGN PATENT DOCUMENTS

| | | | |
|---|---|---|---|
| 122320 | 7/1972 | Australia | 264/262 |
| 1360852 | 7/1974 | United Kingdom. | |

OTHER PUBLICATIONS

Del Gatto, "Materials and Compounding Ingredients for Rubber", Rubber World, N. Y. (1968) pp. 51 & 108.

*Primary Examiner*—W.E. Hoag
*Attorney, Agent, or Firm*—Stanley A. Marcus; Edward E. McCullough

[57] ABSTRACT

Cylindrical, flexible bearings of the type constructed of concentric, annular layers of elastomer and rigid material mutually bonded together are molded under high temperatures and pressures to fluidize the elastomer and to neutralize the tensile stresses that would otherwise result from shrinkage of the elastomer during cure and cooling thereof.

4 Claims, 2 Drawing Figures

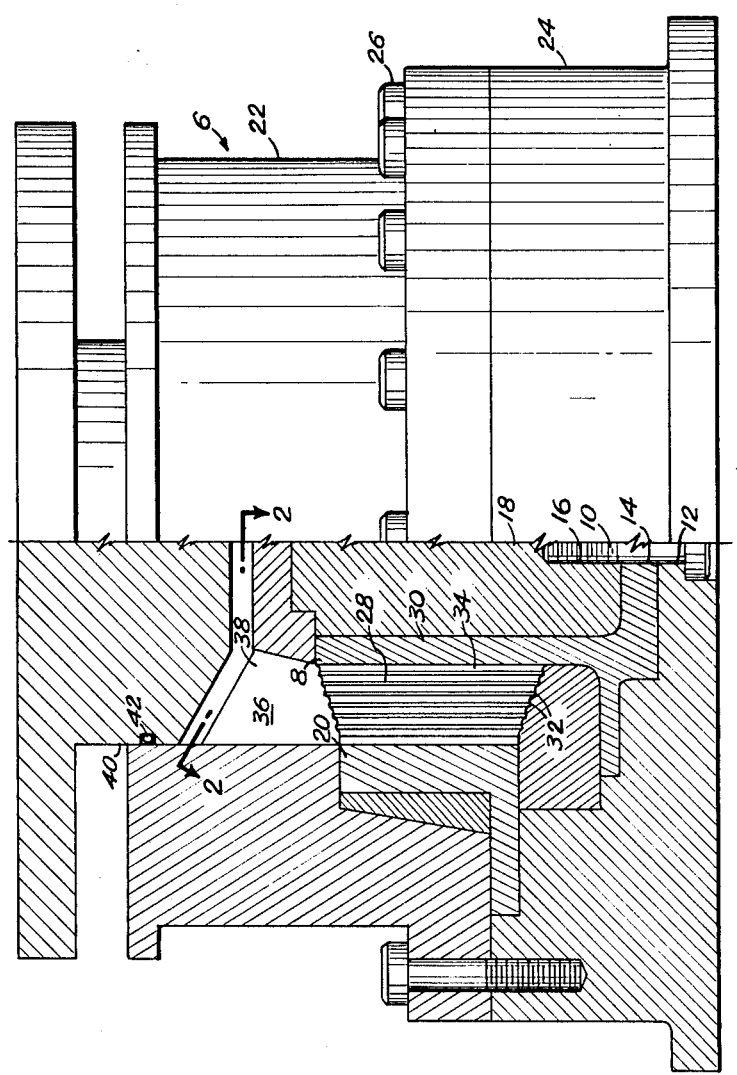

METHOD FOR MAKING FLEXIBLE, CYLINDRICAL BEARINGS

The Government has rights in this invention pursuant to Contract No. DAAJ02-73-C-0091, awarded by the U.S. Army.

BACKGROUND OF THE INVENTION

This invention relates broadly to flexible bearings. More specifically, it relates to bearings constructed of alternate, concentric, annular layers of elastomer and rigid material, each layer being bonded to adjacent layers; and to such bearings that are substantially free of internal, tensile stresses.

There are many uses for cylindrical bearings of the type having alternate, annular, concentric layers of elastomer and rigid material bonded together. A use of particular concern in the present invention is for supporting helicopter rotors relative to the central hub thereof. In such an application, the bearings are subjected to omni-directional, random forces. Whenever the bearing is subjected to a side force, the portion between the center of the bearing and the impressed force is under compression, while the opposite half of the bearing is under tensile stresses. Bearings of this nature perform very well under compression; but are very weak under tension and tend to fail at the bond interfaces between the elastomeric and rigid layers. This tendency is aggravated by the fact that the elastomeric layers of such bearings usually have built-in tensile stresses caused by shrinkage during cure and cooling of the elastomer when the bearing is manufactured.

Flexible bearings of the type described herein are well known and are shown in patents such as in U.S. Pat. Nos. 3,787,102 to Moran; 3,750,249 to Brandon et al.; and 2,995,907 to Orain. None of these patents, however, is concerned with the problem and solution therefor that comprises the subject matter of the present invention; i.e., means of producing such bearings that are free of internal, tensile stresses.

SUMMARY OF THE INVENTION

The present invention is directed toward solving this problem in prior-art, elastomeric bearings. Objects of the invention are to provide an elastomeric bearing wherein the internal tensile stresses have been neutralized, so that the operating life thereof is greatly extended; and to provide a manufacturing process that accomplishes this purpose. Important features of the invention are that it does not alter the physical appearance or dimensions of the bearing, and it comprises a fairly simple procedure.

The invention is essentially a process for manufacturing stress-free, elastomeric bearings of the type constructed of concentric annular layers or shims of rigid material separated by, and bonded to, annular pads of elastomer. In a preferred embodiment, the annular layers of rigid material are concentric, hollow, steel cylinders. According to the invention, these cylinders are assembled in a cylindrical mold, and the entire assembly, as well as the uncured elastomer, is heated to the temperature at which fluidity of the elastomer is greatest. The elastomer is then poured into the spaces between the steel cylinders to an excess that covers the tops of the cylinders. A hydraulic ram, introduced into the top of the mold, then pressurizes the elastomer during its heat-cure cycle. The quantity of hydrostatic pressure induced in the elastomer is selected to be sufficient to yield a finished, flexible bearing that has no internal, tensile stresses at a desired temperature.

BRIEF DESCRIPTION OF THE DRAWINGS

In the drawings:

FIG. 1 is a half, longitudinal section of the mold apparatus with the flexible bearing parts installed; and FIG. 2 is a half cross section taken on line 2—2 of FIG. 1.

DESCRIPTION OF THE PREFERRED EMBODIMENTS

In a preferred embodiment of the invention, all rigid parts of the bearing are: rough machined from steel, according to the desired dimensions; ultrasonically inspected for possible flaws; and fine machined. After final inspections, the parts are cadmium plated.

A natural, uncured, rubber formulation is then prepared and tested for the desired viscosity and shear modulus. A typical, preferred formulation is, in parts by weight:

| | |
|---|---|
| Raw latex | 100 |
| Carbon black | 30 |
| Zinc oxide | 5 |
| Sulfur | 0.6 |
| Zinc 2-Ethyl hexanoate | 2 |
| 2-Morpholinothio benzothiazole | 1.44 |
| Tetrabutylthiuram disulphide | 0.6 |
| Poly-2,2,4-trimethyl 1-1,2-dihydroquinoline | 2 |

The latex is Standard Malaysian Rubber Grade No. 5. The tetrabutylthiuram disulfide is available under the trade name, "Butyl Tuads," from the R. T. Vanderbilt Company of Los Angeles, Calif. The 2-morpholinothio benzothiazole is sold under the trade name, "Santocure MOR" from the Monsanto Company of St. Louis, Mo. The poly-2,2,4-trimethyl 1-1,2-dihydroquinoline is available under the trade name, "Flectol H," also from Monsanto Company of St. Louis, Mo. All ingredients are mixed together and thoroughly blended in a mechanical mixer, typically in 400 lb. batches.

The rigid parts are then placed in a mold 6, wherein the inner mounting ring 8 is secured and centered by a screw 10 that passes through a central hole 12 in the mold 6, a central hole 14 in the inner ring 8, and engages a threaded hole 16 in the centering block 18. The block 18 is shaped to fit inside the inner mounting ring 8 with close tolerances to prevent any movement thereof. The outer mounting ring 20 is similarly maintained in a fixed position by the interior surfaces of the mold 6, which, in this embodiment of the invention, comprises a flanged, hollow cylinder 22 fixed to a base member 24 by screws 26. The hollow, concentric cylinders of varying radii that comprise the rigid layers or shims 28 of the bearing 30 are held in position by concentric grooves 32 in the base member 24 of the mold 6.

When all mechanical parts are in place in the mold 6, the entire assembly and the uncured rubber composition are heated to about 200° F. This is the temperature at which fluidity of the rubber composition is greatest.

This rubber composition is then poured into the spaces 34 between the steel cylinders 28, a considerable excess of the rubber being provided so that the tops of the cylinders 28 are well covered. The cap piece 36 of the mold 6 is then installed and pressed downwardly until it contacts the upper ends of the mounting ring 8 and centering block 18. The excess rubber escapes through radial slots 38 in the cap piece 36 during this procedure and covers the cap piece 36.

A punch 40, fixed to the end of a hydraulic ram (not shown), is then fitted into upper portion of the mold 6, and pressure of approximately 10,000–15,000 psi is applied thereby to the rubber composition in the mold. A rubber sealing ring 42, seated in an annular groove in the punch 40, prevents escape of the liquid rubber in the mold 6. Sufficient excess rubber is provided to prevent the hydraulic punch 40 from actually contacting, or bottoming out on the cap piece 36. The temperature of about 300° F. and hydrostatic pressure are applied for about one-half hour, until the rubber is cured.

The pressure applied by the hydraulic ram is determined to be the pressure required to produce an elastomeric bearing that is free of internal, tensile stresses at 70° F. according the equation:

$$*\bar{p} = k\, 3\alpha\, \Delta T,$$

where $\bar{p}$ is the hydrostatic pressure applied during cure of the elastomer, k is the bulk modulus of the elastomer, $\alpha$ is its coefficient of linear expansion, and $\Delta T$ is the difference between the molding temperature and the temperature at which the cured elastomer is to be stress-free. In this preferred embodiment, the hydraulic punch 40 is plated with an aluminum-bronze alloy to minimize wear on cylindrical surfaces of the mold 6.

* This equation is derived as follows:

The bulk modulus, k, is defined as the ratio of pressure on the material to the resulting fractional change in volume (the volume v at molding temperature over the volume $v_o$ at the temperature at which the bearing is to be stress-free), or:

$$k = \bar{p}/(\Delta v/v_o) \qquad (1)$$

The coefficient of volume expansion, $3\alpha$, is obtained from the coefficient of linear expansion, $\alpha$, which has been determined for the material.

From (1) above, $\bar{p} = k\, \Delta v/v_o$;
but, $\Delta v/v_o = 3\alpha\, \Delta T$, where $\Delta T$ is the difference between the molding temperature and the temperature at which the bearing is to be stress-free.
Hence, $\bar{p} = k\, 3\alpha \Delta T$.

It will be noted that this is only an approximate, but useful, method of determining the molding pressure, since it neglects possible shrinkage in volume of the elastomer as a result of polymerization.

Excess elastomer is removed from the bearing by machining.

A number of other rubber compositions have been found to be useful in elastomeric bearings of the type described, including synthetic rubbers, and are well known in the art. The present invention is applicable to any such material that shrinks during its cure cycle. Also, rigid materials other than steel may be useful and desirable for use in making the cylinders 28 for specific applications of the bearing 30. Other details of process and construction of the invention may be altered without departing from the scope of the invention, as it is defined in the following claims.

The invention claimed is:

1. The method for making a cylindrical, flexible bearing, of the type constructed of alternate, annular layers of elastomer and rigid material bonded together, that are substantially free of internal, tensile stresses at a predetermined temperature, comprising the steps of:
   placing concentric, hollow cylindrical shims of rigid material in a mold between concentric, radially-spaced mounting rings;
   heating the cylinders, the mold, and the uncured elastomer to the temperature at which fluidity of the elastomer is greatest;
   pressing the elastomer into the mold so that spaces between the shims are filled and an excess of elastomer covers the shims so that the ends of the shims cannot limit the pressure applied;
   pressurizing the elastomer in the mold to provide a hydrostatic pressure of about 10,000 to 15,000 psi, calculated to produce a stress-free bearing at a predetermined temperature according to the equation $p = k3\alpha\Delta T$ (where p is the applied pressure, k is the bulk modulus of the elastomer, is the coefficient of linear expansion, and
   $\Delta T$ is the difference between the molding temperature and the temperature at which the bearing is to be stress-free), until the elastomer is cured and bonded to said shims and said mounting rings thereby forming said bearing and removing the bearing from the mold.

2. The method of claim 1 wherein the step of heating the cylinders, the mold, and the uncured elastomer is to a temperature of about 200° F.

3. The method of claim 1 wherein the step of pressurizing the elastomer is maintained for about one-half hour and includes raising the temperature thereof to about 300° F. and maintaining it during this time period.

4. The method for making a cylindrical, flexible bearing, of the type constructed of alternate, annular layers of elastomer and rigid material bonded together, that are substantially free of internal, tensile stresses at room temperature, comprising the steps of:
   placing concentric, hollow cylindrical shims of rigid material in a mold between concentric, radially-spaced mounting rings;
   heating the cylinders, the mold, and elastomer, to about 200° F.;
   pressing the elastomer, in its uncured state, between the shims, so that all spaces are completely filled and an excess of elastomer covers the tops of the cylinders;
   pressurizing the elastomer in the mold until a hydrostatic pressure of about 10,000–15,000 psi is produced in the elastomer and maintaining this prressure until the elastomer is cured and bonded to said shims and said mounting rings;
   raising the temperature of the cylinders and elastomer to about 300° F. during cure of the elastomer; thereby forming said bearing and
   removing the bearing from the mold; and removing any excess elastomer from the bearing.

* * * * *